United States Patent
Wang et al.

(10) Patent No.: US 7,524,786 B2
(45) Date of Patent: *Apr. 28, 2009

(54) REGENERATION OF SYNTHESIS GAS CATALYSTS

(75) Inventors: Daxiang Wang, Ponca City, OK (US); Baili Hu, Miami, FL (US); Yaming Jin, Ponca City, OK (US); Harold A. Wright, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 733 days.

This patent is subject to a terminal disclaimer.

(21) Appl. No.: 11/113,756

(22) Filed: Apr. 25, 2005

(65) Prior Publication Data

US 2005/0209349 A1 Sep. 22, 2005

Related U.S. Application Data

(63) Continuation of application No. 10/219,148, filed on Aug. 15, 2002, now Pat. No. 6,896,868.

(51) Int. Cl.
*B01J 38/12* (2006.01)
(52) U.S. Cl. .................................... 502/38; 502/53
(58) Field of Classification Search ................ 502/38, 502/51, 53
See application file for complete search history.

(56) References Cited

U.S. PATENT DOCUMENTS

| | | | |
|---|---|---|---|
| 4,446,009 A | 5/1984 | Bartholic | 208/113 |
| 4,925,819 A | 5/1990 | Fung et al. | 502/37 |
| 5,106,798 A | 4/1992 | Fung | 502/37 |
| 5,260,238 A | 11/1993 | Murakawa et al. | 502/26 |
| 6,284,807 B1 | 9/2001 | Leviness et al. | 518/710 |
| 6,896,868 B2 * | 5/2005 | Wang et al. | 423/651 |

OTHER PUBLICATIONS

Lago et al., *Partial Oxidation of Methane to Synthesis Gas Using $LnCoO_3$ Perovskites as Catalyst Precursors*, Journal of Catalysis 167, pp. 198-209 (1997) Article No. CA971580.
Schmidt et al., *Catalytic Partial Oxidation Reactions and Reactors*, Chemical Engineering Science vol. 49, No. 24A, pp. 3981-3994 (1994).
Basini et al., *Molecular and Temperature Aspects in Catalytic Partial Oxidation of Methane*, Journal of Catalysis 190, pp. 284-295 (2000).
Basini et al., *Drift and Mass Spectroscopic Studies on the Reactivity of Rhodium Clusters at the Surface of Polycrystalline Oxides*, J. Phys. Chem. (1992) 96, pp. 9431-9441.
Zaki et al., *Highly Dispersed Rhodium on Alumina Catalysts: Influence of the Atmosphere on the State and Dispersion of Rhodium*, J. Phys. Chem. (1987) 91, pp. 1486-1493.
Anderson et al. *Catalysis Science and Technology*, vol. 5, (1984).
Schulz et al., *Applied Catalyst* vol. 186 Nos. 1, 2 Oct. 1999 (229 p.).

* cited by examiner

*Primary Examiner*—Edward M Johnson

(57) ABSTRACT

The present invention relates to a process for the preparation of synthesis gas (i.e., a mixture of carbon monoxide and hydrogen), typically labeled syngas. More particularly, the present invention relates to a regeneration method for a syngas catalyst. Still more particularly, the present invention relates to the regeneration of syngas catalysts using a re-dispersion technique. One embodiment of the re-dispersion technique involves the treatment of a deactivated syngas catalyst with a re-dispersing gas, preferably a carbon monoxide-containing gas such as syngas. If necessary, the catalyst is then exposed to hydrogen for reduction and further re-dispersion.

29 Claims, No Drawings

REGENERATION OF SYNTHESIS GAS CATALYSTS

This application is a continuation of U.S. Ser. No. 10/219,148 filed Aug. 15, 2002, entitled "Regeneration of Synthesis Gas Catalysts," now US Pat. No. 6,896,868, issued May 24, 2005, and is incorporated herein by reference.

STATEMENT REGARDING FEDERALLY SPONSORED RESEARCH OR DEVELOPMENT

Not applicable.

FIELD OF THE INVENTION

The present invention relates to a process for the preparation of synthesis gas (i.e., a mixture of carbon monoxide and hydrogen), typically labeled syngas. More particularly, the present invention relates to novel methods of regenerating syngas catalysts via chemical re-dispersion of the catalytic metals.

BACKGROUND OF THE INVENTION

Catalysis is literally the lifeblood for many industrial/commercial processes in the world today. The most important aspect of a catalyst is that it can increase the productivity, efficiency and profitability of the overall process by enhancing the rate, activity and/or selectivity of a given reaction. Many industrial/commercial processes involve reactions that are simply too slow and/or inefficient to be economical without a catalyst present. For example, the process of converting natural gas or methane to liquid hydrocarbons (an extremely desirable process) necessarily involves several catalytic reactions.

The conversion of methane to hydrocarbons is typically carried out in two steps. In the first step, methane is catalytically converted to carbon monoxide and hydrogen (i.e., synthesis gas or syngas). In a second step, the syngas intermediate is catalytically converted to higher hydrocarbon products by processes such as the Fischer-Tropsch Synthesis or to chemicals by processes such as an alcohol synthesis. For example, fuels such as hydrocarbon waxes and liquid hydrocarbons comprised in the middle distillate range, i.e., kerosene and diesel fuel may be produced from the synthesis gas.

Current industrial use of methane as a chemical feedstock for syngas production proceeds by the initial conversion of methane to carbon monoxide and hydrogen by either steam reforming or dry reforming. Steam reforming currently is the major process used commercially for the conversion of methane to synthesis gas, the reaction proceeding according to Equation 1.

$$CH_4 + H_2O \leftrightarrows CO + 3H_2 \qquad (1)$$

The catalytic partial oxidation ("CPOX") of hydrocarbons, e.g., methane or natural gas, to syngas has also been described in the literature. In catalytic partial oxidation, natural gas is mixed with air, oxygen-enriched air, or oxygen, and introduced to a catalyst at elevated temperature and pressure. The partial oxidation of methane yields a syngas mixture with a more preferable $H_2$:CO ratio of 2:1, as shown in Equation 2:

$$CH_4 + \tfrac{1}{2}O_2 \leftrightarrows CO + 2H_2 \qquad (2)$$

The $H_2$:CO ratio for this reaction is more useful for the downstream conversion of syngas to chemicals such as methanol or to fuels than is the $H_2$:CO ratio from steam reforming. However, both reactions continue to be the focus of research in the world today.

As stated above, these reactions are catalytic reactions and the literature is replete with varying catalyst compositions. The catalyst compositions typically are comprised of at least one catalytically active metal, such as a Group VIII metal. Many catalyst compositions also have other promoters present. Catalytic metals are typically selected based on their activity and selectivity towards a particular reaction. Further, the catalyst compositions typically include particular support materials such as alumina, silica, titania, etc., that can also enhance the catalyst activity.

After a period of time in operation, a catalyst will become deactivated, losing its effectiveness for catalyzing the desired reaction to a degree that makes the process uneconomical at best and inoperative at worst. This process is generally known as "aging." The more aged a particular catalyst the less efficient the catalyst is at enhancing the reaction, i.e., less activity it has. At this point, the catalyst can be either replaced or regenerated. However, replacing a catalyst typically means discarding the deactivated catalyst. Even if a fresh replacement catalyst is ready and available, a single syngas reactor will typically have to be shut down and offline for days to weeks. The time delay is due at least in part to the time required for simple cooling and heating of the reactor.

In addition, a discarded catalyst represents a loss of expensive metals. Alternatively, the user may send the catalyst back to the supplier for recovery of expensive metals, such as Rh, Pt, Pd, etc. However, the recovery process involves dissolving the multi-component catalyst and subsequent separation of the active components from the mixed solution such as a method described in co-owned and pending patent application Ser. No. 10/176,224. The chemistry is complex and costly, more importantly, it involves bulk amounts of harsh chemicals that ultimately must be discarded and the use of landfills for such disposal is problematic. For example, the environmental protection agency (EPA) "Land Ban" imposes restrictions on disposal because these harsh chemicals can release toxins into the environment. For all of these reasons, regeneration is preferred over replacement.

However, regeneration has problems as well. Like replacement, regeneration typically requires some downtime resulting in a decrease in production. In addition, regeneration may not be possible for every deactivated catalyst. Catalysts systems can become deactivated by any number of mechanisms. Some of the more common deactivating mechanisms include coking, sintering, poisoning, oxidation, and reduction. The process chiefly responsible for deactivation varies among catalyst systems. Some catalysts that have been deactivated can be regenerated and/or the deactivation reaction can be reversed. However, many regeneration processes are not economically feasible.

Sintering as a cause of deactivation has traditionally been viewed as a non-reversible phenomenon, since a sintered catalyst is particularly difficult to regenerate. In terms of synthesis gas catalysts, sintering is usually the result of the high temperatures within the catalyst bed. The syngas reactions achieve very high temperatures during operation. Temperatures within a syngas catalyst bed typically reach temperatures in excess of 1000° C. Sintering for syngas catalysts is practically unavoidable.

Chemical reaction of sintered metals and/or its compounds with some reagents to form volatile compounds has been found to be effective in redispersing sintered active metals. For example, formation of platinum oxychloride has been used to disperse platinum.

In U.S. Pat. No. 5,106,798, a procedure is disclosed for regeneration of zeolite supported noble metal, such as platinum, catalysts. One of the steps in the disclosed process is to redisperse the noble metal on the surface of the catalyst support by contacting the catalyst with halogen gas and carbon dioxide.

U.S. Pat. No. 4,925,819 discloses a method of regenerating a reforming catalyst comprising a type L zeolite containing a group VIII noble metal via an oxychlorination procedure. The catalyst is prepared by heating the catalyst in the presence of oxygen, hydrogen or other inert gas, and water. The catalyst surface is then chlorinated under similar conditions. Finally, the chlorine is removed primarily by heating under the appropriate chemical atmosphere.

U.S. Pat. No. 5,260,238, described a method of regenerating catalyst comprised of Noble metal/zeolite, in which the deactivated catalyst was first de-coked through reduction/oxidation, then contacting the deactivated catalyst with a solution containing a halogen or a galogen-containing compound and thereafter calcining the deactivated catalyst.

Chemical atmosphere also has a strong effect on rhodium dispersion on metal oxide supports. Zaki et al reported in J. Phys. Chem. 1987, 91, 1486-1493 that "successive cycles of CO adsorption and regeneration of a catalyst in $H_2$ causes deterioration of the dispersion and progressive formation of larger Rh aggregates".

It was also reported that rhodium carbonyl can be used as precursor to graft Rh on metal oxide support (L. Basini et al, J. Phys. Chem., 1992, 96, p 9431-9441) through the following reaction:

$$Rh_4(CO)_{12}+[M]-OH \rightarrow [M]-O-Rh^1(CO)_2+H_2+CO$$

where M is a metallic element that is contained on a support.

Because regeneration of syngas catalysts has traditionally been so difficult, the active metals are typically dissolved and recaptured for use in new catalyst batches. However, research is continuing on the development of more efficient syngas catalyst systems and catalyst systems that can be more effectively regenerated. To date there are no known methods that are economically feasible for regenerating a sintered syngas catalyst.

Hence, there is still a great need to identify new regeneration methods, particularly methods that are quick and effective for regenerating deactivated syngas catalysts without having to dissolve the catalyst components and without significant downtime or loss of production.

SUMMARY OF THE INVENTION

The present invention relates to a process for the preparation of synthesis gas (i.e., a mixture of carbon monoxide and hydrogen), typically labeled syngas. More particularly, the present invention relates to novel methods of regenerating syngas catalysts via chemical re-dispersion of the catalytic metals.

The regeneration of the syngas catalysts is accomplished through the formation of rhodium carbonyl intermediates and their interaction with the surface of the support material to improve the metal dispersion. This is done by contacting a gas with the deactivated catalyst that restores the catalytic metal to its active form and/or restores active surface area of the catalytic metals lost from deactivation phenomenon. This gas is hereby referred to as a re-dispersing gas throughout this disclosure. A re-dispersing gas is defined as any gas that causes an increase in metal surface area of the catalyst when passed over the catalyst at various temperatures and pressures. The present invention is primarily directed towards syngas catalysts used in partial oxidation reactions and even more preferably used in syngas catalysts that contain Group VIII noble metals.

One embodiment of the present invention restores the activity of a sintered catalyst by exposing the deactivated catalyst to carbon monoxide gas. Without wishing to be bound to a particular theory, the applicants believe that some metal carbonyl compounds form with the deactivated catalytic metals, that are then allowed to disperse when heated to a temperature sufficient to mobilize them. It is a hypothesis that the following reactions may be involved in the redispersion process:

$$4Rh+12CO \rightarrow Rh_4(CO)_{12}$$

$$Rh_2O_3+CO \rightarrow Rh_4(CO)_{12}+CO_2$$

$$Rh_4(CO)_{12}+[M]-OH \rightarrow [M]-O-Rh^1(CO)_2+H_2+CO$$

The deactivated catalysts can be treated in a pressurized vessel with carbon monoxide gas or a mixture of carbon monoxide and other gases, such as syngas. In addition, the vessel can be a syngas reactor vessel. The applicants believe, although not wishing to be bound to this theory, that, as the metal carbonyl forms, it re-disperses the catalytic metal restoring or recovering much, if not all, of the lost activity. The treatment can be carried out in a flowing system or a static batch operation.

These and other embodiments, features and advantages of the present invention will become apparent with reference to the following detailed description and examples.

DETAILED DESCRIPTION OF THE PREFERRED EMBODIMENTS

The preferred embodiments are shown in the examples, and herein will be described in detail, specific embodiments of the present invention with the understanding that the present disclosure is to be considered an exemplification of the principles of the invention, and is not intended to limit the invention to that illustrated and described herein. The present invention is susceptible to embodiments of different forms or order and should not be interpreted to be limited to the particular structures or compositions contained herein. In particular, various embodiments of the present invention provide a number of different configurations of the overall gas to liquid conversion process.

The regeneration of a syngas catalyst is accomplished by contacting a gas with a deactivated catalyst that restores the catalytic metal to its active form and/or restores active surface area of the catalytic metals lost from deactivation phenomenon. The present invention is primarily directed towards syngas catalysts used in partial oxidation reactions and even more preferably used in syngas catalysts that contain Group VIII noble metals.

According to the present invention, a syngas reactor can comprise any of the synthesis gas technology and/or methods known in the art. The hydrocarbon-containing feed comprises almost exclusively natural gas. However, the most important component is generally methane. Methane or other suitable hydrocarbon feedstocks (hydrocarbons with four carbons or less) are also readily available from a variety of other sources such as higher chain hydrocarbon liquids, coal, coke, hydrocarbon gases, etc., all of which are clearly known in the art. Similarly, the oxygen-containing gas may come from a variety of sources and will be somewhat dependent upon the nature of the reaction being used. For example, a partial oxidation reaction requires diatomic oxygen as a feedstock while steam reforming requires only steam. According to the preferred embodiment of the present invention, partial oxidation is assumed for at least part of the syngas production reaction.

Regardless of the sources, the hydrocarbon-containing feed and the oxygen-containing feed are reacted under catalytic conditions. The catalyst compositions useful for synthesis gas reactions are well known in the art. They generally are comprised of a catalytic metal. The most common catalytic metals are Group VIII metals noble metals. The support structures may be monoliths, wire mesh and particulates. Often, the support selected will dictate the type of catalyst bed that must be used. For example, fixed beds are comprised of monoliths and large particle sized supports. Supports comprised of small particles tend to be more useful in fluidized beds. The support matrix usually comprises a refractory material, preferably a metal oxide or mixture of metal oxides, such as alumina, titania, zirconia or the like.

The synthesis gas feedstocks are generally preheated, mixed and passed over or through the catalyst beds. As the mixed feedstocks contact the catalyst the synthesis reactions take place. The synthesis gas product contains primarily hydrogen and carbon monoxide, however, many other minor components may be present including steam, nitrogen, carbon dioxide, ammonia, hydrogen cyanide, etc., as well as unreacted feedstock, such as methane and/or oxygen. The synthesis gas product, i.e., syngas, is then ready to be used, treated, or directed to its intended purpose. For example, in the instant case some or all of the syngas may be used to prepare regeneration gases for the present invention or may be used as a feedstock for a Fischer-Tropsch process or other processes such as an alcohol synthesis plant.

The syngas process is operated at atmospheric or superatmospheric pressures, the latter being preferred. The pressures may be from about 100 kPa to about 32,000 kPa (about 1-320 atm), preferably from about 200 kPa to 10,000 kPa (about 2-100 atm). The process is preferably operated at temperatures of from about 600° C. to about 2,000° C., preferably from about 600° C. to about 1,600° C. Space velocities for the syngas catalytic partial oxidation process, stated as gas hourly space velocity (GHSV), are from about 20,000 to about 100,000,000 $hr^{-1}$, preferably from about 100,000 to about 25,000,000 $hr^{-1}$. The syngas stream is typically at a temperature of about 600-1600° C. when leaving a syngas reactor. The syngas must be transitioned to be useable in a Fischer-Tropsch reactor or other synthesis reactors, which operate at lower temperatures of about 200° C. to 400° C. The syngas is typically cooled, dehydrated (i.e., taken below 100° C. to knock out water) and compressed during the transition phase. Thus, in the transition of syngas from the syngas reactor to a Fischer-Tropsch reactor or alcohol synthesis reactor, the syngas stream may experience a temperature window of 50° C. to 1600° C. Several reactions have been discovered that can restore the activity to a deactivated syngas catalyst depending on the deactivation phenomenon. One such deactivation phenomenon is sintering. Sintering results in a significant loss of catalytically active surface area, which ultimately leads to decreased activity of the overall catalyst composition. One embodiment of the present invention restores the activity of a sintered catalyst by exposing the deactivated syngas catalyst to carbon monoxide-containing gas. The applicants believe that there is a formation of metal carbonyls with the deactivated catalytic metals. The carbon monoxide-containing gas can be substantially pure carbon monoxide or carbon monoxide mixed with other gases, such as syngas. Accordingly, the carbon monoxide-containing gas can be from recycled gas streams that may already be present in a gas-to-liquid conversion process, from bottled gas, from produced syngas, or from any other available source, or any combinations thereof. Care must be taken to avoid coke deposition on the catalyst when using syngas as the carbon monoxide source. For example, the operation temperature should be controlled below 500° C. to avoid carbon formation as the results of CO disproportionation. It is further believed that the formation of he metal carbonyls occur at relatively low temperatures in the range from about room temperature to about 500° C. and at pressures of between vacuum to about 300 atmospheres, depending upon the catalyst metal. For this reason, the treatment with the re-dispersing gas is performed at a temperature preferably from about 25° C. to about 500° C., and more preferably from about 50° C. to about 400° C., and at a pressure preferably from about 1 to about 50 atmospheres, more preferably from about 10 to about 30 atmospheres. Thus, the catalyst can be treated in a vessel capable of being pressurized such as a syngas reactor or other pressurized vessel. In any event, it is preferred to select the temperature that would be sufficient to promote the formation of the carbonyls, to mobilize them and to promote the interaction of the carbonyls with the catalyst surface.

Prior to the treatment of the sintered catalyst in CO-containing gases, it is preferred to calcine the sintered catalyst in oxidative atmosphere to convert the active metal(s), such as Rh, to its oxidized state. The calcination can be carried in oxygen-containing gas, such as air, pure oxygen, at temperatures from about 100° C. to about 800° C.

After the treatment with the CO-containing gas, the applicants believe that a calcination step in gas streams relatively low in CO, such as nitrogen, helium, hydrogen, and/or oxygen at elevated temperature could help decompose the carbonyl compounds and form the activated state of the active metals. It should be appreciated that the concentration of carbon monoxide in the stream need not be zero, but should be less than about 1 wt % or at least low enough that the carbon monoxide does not significantly inhibit the overall loss of carbonyls from the catalyst surface. For syngas catalysts, the decomposition or removal treatment can be carried out in an oxygen-containing gas at temperatures of from about 25° C. to about 500° C.

The present invention will be more easily and fully understood by the following examples. The examples are representative of the regeneration processes in accordance with one embodiment of the preferred present invention.

EXAMPLES

Chemicals Used for Catalyst Preparation $Al_2O_3$: Alumina, Aldrich #19,997-4, activated neutral, 150 mesh powder, surface area: 155 $m^2$ $RhCl_3$: Rhodium(III) chloride hydrate, crystal, 99.9+%, Aldrich, lot# 08822HU, MW: 209.26

(1) Procedure of Base Material (2 wt. % Rh on Alumina) Preparation:

Pretreatment of support: Alumina was heated up in flowing air (60 ml/min) to 1100° C. at a rate of at 5° C./min and calcined at 1100° C. for 5 hours, then cooled down to room temperature in air.

Impregnation. 1.22 g of $RhCl_3.xH2O$ was impregnated through incipient wetness impregnation onto 30 g of pretreated alumina. The sample was then dried at room temperature for 1 hour and 120° C. for 4 hours.

Calcination: The dried sample was heated up to 700° C. at 10° C./min and calcined at 700° C. for 3 hours, then cooled down to room temperature. All were done in flowing air. The calcined sample was designated Example A.

Reduction: 15 g of Example A was reduced in $H_2/N_2$ (300/300 ml/min) by heating up the sample in stages. The sample was heated to 125° C. at 3° C./min and held there for 30 min, then to 500° C. at 3° C./min and held there for 3 hours. Finally, the sample was cooled down in $H_2/N_2$ to room temperature at 10° C./min. The reduced sample was designated Example B.

Sintering of reduced sample: 10 g of Example B was calcined/sintered in air (150 ml/min) by heating the sample to 1000° C. at a rate of 10° C./min and holding it there for 3 hours, then cooling down to room temperature. The sintered sample was designated Example C.

Reduction of sintered sample: 5 g of Example C was reduced in $H_2/N_2$ (300/300 ml/min) by heating the sample to 125° C. at a rate of 3° C./min and holding it there for 30 min, then to 500° C. at 3° C./min and holding it there for 3 hours and finally cooled down in $H_2/N_2$ to room temperature at 10° C./min. The reduced sample was designated Example D.

(2) Pretreatment in Syngas Mixture

Autoclave reactors were used to carry out the redispersion treatment. This facility has four 100 ml reactor chambers to carry out the treatment in parallel. The following conditions were applied to treat the four model catalysts represented as Examples A, B, C, and D to generate 4 new samples defined as Examples E, F, G, and H respectively. Gas composition: $CO/H_2/N_2$ (30/60/10 molar ratio); Pressure: 485 psi; Temperature: 97.5° C.

Procedure: Load 2 g of the catalyst sample in the reactors, then, pressurize the reactor with $CO/H_2/N_2$ to 485 psi. Heat the reactor up to 100° C. at 5° C./min, hold for 24 hours, cool the reactor down to room temperature and collect the sample as re-dispersed.

(3) Metal Surface Determination

Metal surface area analysis was conducted to evaluate the redispersion efficiency. The metal surface area of the catalyst is determined by measuring the dissociation of $H_2$ on the surface of the metal. A Micromeritics ASAP 2010 automatic analyzer system is used, employing $H_2$ as a probe molecule. The ASAP 2010 system uses a flowing gas technique for sample preparation to ensure complete reduction of reducible oxides on the surface of the sample. A gas such as hydrogen flows through the heated sample bed, reducing the oxides on the sample (such as platinum oxide) to the active metal (pure platinum). Since only the active metal phase responds to the chemisorbate (hydrogen in the present case), it is possible to measure the active surface area and metal dispersion independently of the substrate or inactive components. The analyzer uses the static volumetric technique to attain precise dosing of the chemisorbate and rigorously equilibrates the sample. The first analysis measures both strong and weak sorption data in combination. A repeat analysis measures only the weak (reversible) uptake of the probe molecule by the sample supports and the active metal. As many as 1000 data points can be collected with each point being fully equilibrated.

Prior to the measurement of the metal surface area the sample is pre-treated. The first step is to pretreat the sample in He for 1 hr at 100° C. The sample is then heated to 350° C. in He for 1 hr. These steps clean the surface prior to measurement. Next the sample is evacuated to sub-atmospheric pressure to remove all previously adsorbed or chemisorbed species. The sample is then oxidized in a 10% oxygen/helium gas at 350° C. for 30 minutes to remove any possible organics that are on the surface.

The sample is then reduced at 500° C. for 3 hours in pure hydrogen gas. This reduces any reducible metal oxide to the active metal phase. The sample is then evacuated using a vacuum pump at 450° C. for 2 hours. The sample is then cooled to 35° C. prior to the measurement. The sample is then ready for measurement of the metal surface.

From the measurement of the volume of $H_2$ uptake during the measurement step, it is possible to determine the metal surface area per gram of catalyst structure by the following equation.

$$MSA = (V)(A)(S)(a)/22400/m$$

where MSA is the metal surface are in $m^2$/gram of catalyst structure;
V is the volume of adsorbed gas at Standard Temperature and Pressure in ml.;
A is the Avogadro constant;
S is the stoichiometric factor (2 for $H_2$ chemisorption);
m is the sample weight in grams; and
a is the metal cross sectional area.

The metal surface area per gram of metal is then determined by dividing the MSA by the weight fraction of the metal in the catalyst with the following unit of g metal/g. catalyst. The results in Table 1 were determined using rhodium as the metal in the equation above for MSA.

(4) Summary of the Examples:

All Examples A-H have a composition of 2 wt % Rh on alumina. The metal surface area results are listed in Table 1. The treatment in syngas mixture affected the metal surface area in two different ways. For the reduced samples, i.e., Examples B and D, the treatment with the syngas-containing gas decreases the metal surface area as seen in Examples F and H respectively. For the oxidized samples, i.e., Examples A and C, the treatment with the syngas-containing gas increases the metal surface area as seen in Examples E and G respectively. Especially for Example C that was calcined at 1000° C., the metal surface area after treatment with the re-dispersing gas was recovered to around 30 $m^2$/g-metal, which was around 50% recovery of the initial surface area.

TABLE 1 summarizes the results on metal surface area measurement.

| Initial oxidation state | Example | Treatments | Metal surface area $M^2$/g sample | $M^2$/g metal |
|---|---|---|---|---|
| Oxidized | A | Calcination at 700° C. | 1.19 | 59.36 |
|  | E | Treating with $CO/H_2/N_2$ gas of Example A | 1.77 | 88.55 |
|  | C | Sintering at 1000° C. of Example B | 0.12 | 5.81 |
|  | G | Treating with $CO/H_2/N_2$ gas of Example C | 0.62 | 30.9 |
| Reduced | B | Reduction at 500° C. of Example A | 1.00 | 49.91 |
|  | F | Treating with $CO/H_2/N_2$ gas of Example B | 0.53 | 26.61 |
|  | D | Reduction at 500° C. of Example C | 0.15 | 7.62 |
|  | H | Treating with $CO/H_2/N_2$ gas of Example D | 0.09 | 4.35 |

While preferred embodiments of this invention have been shown and described, modification thereof can be made by one skilled in the art without departing from the spirit or teaching of this invention. The embodiments described herein are exemplary only and are not limiting. Many variations and modifications of the system and apparatus are possible and are within the scope of this invention. Accordingly, the scope of protection is not limited to the embodiments described herein, but is only limited by the claims, which follow, the scope of which shall include all equivalents of the subject matter of the claims. In particular, unless order is explicitly recited, the recitation of steps in a claim is not intended to require that the steps be performed in any particular order, or that any step must be completed before the beginning of another step.

What is claimed is:

1. A process for regenerating a deactivated syngas catalyst by chemical re-dispersion of a catalytic metal, the process comprising the following steps:
   (a) treating at least a portion of the deactivated syngas catalyst comprising the catalytic metal under oxidation conditions to convert at least a portion of the catalytic metal to its oxidized state; and
   (b) exposing at least a portion of the deactivated syngas catalyst to a re-dispersing gas for a time sufficient to re-disperse at least a portion of the catalytic metal to obtain a reactivated catalyst.

2. The process according to claim 1 wherein the deactivated syngas catalyst comprises sintered catalytic metal or catalytic metal oxide or combinations thereof.

3. The process according to claim 1 wherein the deactivated syngas catalyst comprises a catalytic metal selected from the Group VIII metals.

4. The process according to claim 1 wherein the catalytic metal comprises rhodium.

5. The process according to claim 1 wherein step (a) comprises contacting the deactivated syngas catalyst with a gaseous stream comprising 0.01 to 50% by volume oxygen at a temperature from about 100° C. to about 800° C.

6. The process according to claim 1 wherein step (a) comprises contacting the deactivated syngas catalyst with a gaseous stream comprising 0.01 to 50% by volume oxygen at a temperature from about 200° C. to about 600° C.

7. The process according to claim 1 wherein the re-dispersing gas comprises carbon monoxide.

8. The process according to claim 1 wherein the re-dispersing gas comprises hydrogen.

9. The process according to claim 1 wherein the re-dispersing gas comprises a mixture of hydrogen and carbon monoxide.

10. The process according to claim 1 wherein step (b) comprises contacting the deactivated syngas catalyst with said re-dispersing gas at a temperature from about 25° C. to about 500° C.

11. The process according to claim 1 wherein step (b) comprises contacting the deactivated syngas catalyst with said re-dispersing gas at a temperature from about 50° C. to about 400° C.

12. The process according to claim 1 wherein step (b) is carried out after step (a).

13. The process according to claim 1 wherein step (a) is carried out at a pressure from about 1 to about 50 atmospheres.

14. The process according to claim 1 wherein step (a) is carried out at a pressure from about 10 to about 30 atmospheres.

15. The process of claim 1 further comprising:
    producing syngas in a reactor vessel using a syngas catalyst in its active form wherein at least a portion of said syngas catalyst is deactivated to become said deactivated syngas catalyst; and
    carrying out steps (a) and (b) within that same reactor vessel.

16. The process according to claim 1 further comprising a secondary treatment of the reactivated catalyst obtained after step (b) comprising exposing the reactivated catalyst to a secondary gas to remove or dilute at least one component from the re-dispersing gas.

17. The process according to claim 16 wherein the secondary treatment comprises heating the reactivated catalyst in the secondary gas at a temperature from about 25° C. to about 800° C.

18. The process according to claim 16 wherein the secondary treatment comprises heating the reactivated catalyst in the secondary gas at a temperature from about 200° C. to about 500° C.

19. The process according to claim 16 wherein the secondary gas comprises one or more of the compounds selected from the group consisting of nitrogen, helium, hydrogen, and oxygen.

20. The process according to claim 16 wherein the secondary gas comprises less than about 1 wt % carbon monoxide.

21. The process according to claim 16 wherein the syngas catalyst after the secondary treatment is characterized by a surface area of the catalytic metal which is no less than 15 square meter per gram of loaded catalytic metal as measured with hydrogen adsorption.

22. The process according to claim 16 wherein the syngas catalyst after the secondary treatment is characterized by a the surface area of the catalytic metal which is increased by more than 25% of that of the same syngas catalyst obtained without the process of claim 1.

23. A process for regenerating a deactivated syngas catalyst comprising the following steps:
    exposing a deactivated syngas catalyst comprising a sintered catalytic metal to a CO-containing gas at a temperature below about 500° C. for a time sufficient to obtain a reactivated catalyst; and
    heating the reactivated catalyst in a secondary gas at a temperature from about 25° C. to about 800° C., wherein the secondary gas comprises one or more of the compounds selected from the group consisting of nitrogen, helium, hydrogen, and oxygen.

24. The process according to claim 23 wherein the CO-containing gas further comprises hydrogen.

25. The process according to claim 23 wherein the exposing step is carried out at a temperature from about 25° C. to about 500° C. to re-disperse at least a portion of the catalytic metal.

26. The process according to claim 23 wherein the secondary gas comprises less than about 1 wt % carbon monoxide.

27. The process according to claim 23 wherein the secondary gas comprises an oxygen-containing gas.

28. The process according to claim 23 wherein the heating step is carried out at a temperature from about 200° C. to about 500° C.

29. The process according to claim 23 further comprising calcining the deactivated catalyst in oxidation conditions to convert the catalytic metal to its oxidized state, said calcining step being carried out before the exposing step.

* * * * *